United States Patent
Hsia et al.

(10) Patent No.: US 8,606,181 B2
(45) Date of Patent: Dec. 10, 2013

(54) SECURITY CONNECTION ESTABLISHING METHOD AND RELATED WIRELESS DEVICE AND WIRELESS HOST

(75) Inventors: Min-Hsiang Hsia, Hsin-Chu (TW); Jia-Bin Huang, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 214 days.

(21) Appl. No.: 13/044,551

(22) Filed: Mar. 10, 2011

(65) Prior Publication Data

US 2012/0040617 A1 Feb. 16, 2012

(30) Foreign Application Priority Data

Aug. 12, 2010 (TW) .............................. 99126949 A

(51) Int. Cl.
*H04B 7/00* (2006.01)
(52) U.S. Cl.
USPC ..................... 455/41.2; 455/41.3; 455/432.1

(58) Field of Classification Search
USPC .............. 455/41.2, 41.3, 432.1, 435.2, 456.1, 455/457
See application file for complete search history.

(56) References Cited

U.S. PATENT DOCUMENTS

| 7,462,953 B2 * | 12/2008 | Kamiya et al. ............... 307/10.3 |
| 7,603,131 B2 * | 10/2009 | Wang et al. ..................... 370/328 |
| 8,023,452 B2 * | 9/2011 | Douglas et al. ............... 370/328 |

* cited by examiner

*Primary Examiner* — Tuan H Nguyen
(74) *Attorney, Agent, or Firm* — Winston Hsu; Scott Margo

(57) ABSTRACT

A security connection establishing method for a wireless device and a wireless host is disclosed. The security connection establishing method includes the steps of allowing the wireless device to generate a trigger signal, allowing the wireless host to receive the trigger signal, allowing the wireless host to generate an accepting signal according to the trigger signal, allowing the wireless device and the wireless host to directly establish a security connection according to the accepting signal, and providing a connection result.

16 Claims, 4 Drawing Sheets

SECURITY CONNECTION ESTABLISHING METHOD AND RELATED WIRELESS DEVICE AND WIRELESS HOST

BACKGROUND OF THE INVENTION

1. Field of the Invention

The present invention relates to a connection establishing method and related wireless device and wireless host, and more particularly, to a security connection establishing method and related wireless device and wireless host.

2. Description of the Prior Art

Bluetooth is a small-ranged wireless transmission technology, operated at industrial scientific medical (ISM) frequency band, i.e. 2.4G. A Bluetooth system uses frequency hopping spreading spectrum (FHSS) technique in wireless communication to divide transmission data and upload the transmission data at up to 79 different frequency bands, so as to avoid crosstalk between electronic devices. A main modulation of the Bluetooth system is Gaussian frequency-shifting keying (GFSK), which can achieve up to 1 Mb/s transmission rate and 10 to 100 meters effective transmission distance.

Bluetooth features low transmission power, Omni directional antenna, dual-way communication and auto-pairing with other Bluetooth devices within communication rage. Therefore, Bluetooth is extensively applied to personal computers, mobile phones, mouses, keyboards and other consumer electronic devices.

As for the present Bluetooth human interface device or Bluetooth peripheral (slave) devices, prior to establishing connection, either selecting a device or inputting specific information for connection requires a graphic user interface (GUI) on a Bluetooth master device, such as a personal computer, mobile phone, personal digital assistant (PDA), etc., to set up connection related configuration. When a Bluetooth human interface device tries to connect to another Bluetooth human interface device, a search for Bluetooth devices will be conducted first, followed by showing all the searched Bluetooth devices on the GUI, and then an user must select a Bluetooth device on the GUI for connection and input a personal identification number (hereinafter "PIN code") for "Pairing" the two Bluetooth devices, to ensure security and safety of data transmission. However, such complex and series operations bring inconvenience for the user, and enforce the user to give up Bluetooth related products. For example, when the user tries to install a Bluetooth mouse on a personal computer, after searching for Bluetooth devices, the GUI displays the Bluetooth mouse for the user to select, to set up connection related configuration. The user must use a universal serial bus (USB) mouse, USB keyboard or other input devices to input the PIN code and related configuration on the GUI. Consequently, the user must prepare the USB mouse before using the Bluetooth mouse, which is like adding the fifth wheel on the coach.

In addition, in the conventional Bluetooth system, it is usually the master device searches the slave devices, such as a mouse, keyboard, earphone, speaker, etc. The master device uses fixed power to search all the slave devices within radio range. Therefore, the master device may find a number of slave devices, including the slave device that the user tried to connect with. For example, the user tries to use some Bluetooth mouses, the personal computer tries to search all the slave devices around. If there are a Bluetooth earphone, keyboard and another Bluetooth mouse around at the same time, the personal computer will find these three devices. In such a situation, the user must know the exact model of the Bluetooth mouse, to make the right selection in the GUI.

In short, in the prior arts, if the user tries to use Bluetooth peripheral devices, the user must initiate the GUI, enter the PIN code, and set up connection related configuration. Such complex procedure is very likely to decrease the probability of using peripheral Bluetooth devices. Moreover, when there are more than one Bluetooth peripheral devices, the user must be able to remember the make of the peripheral device, in order to make the right selection, which causes great inconvenience for use.

SUMMARY OF THE INVENTION

It is therefore a primary objective of the present invention to provide a security connection establishing method and related wireless device and wireless host, to facilitate users to use peripheral wireless devices.

The present invention discloses a method for establishing wireless security connection between a wireless device and a wireless host, which comprises steps of generating a trigger signal using the wireless device; receiving the trigger signal using the wireless host; generating an accepting signal according to the trigger signal using the wireless host; receiving the accepting signal using the wireless device; directly establishing a wireless security connection according to the accepting signal using the wireless host and the wireless device; and providing a connection result according to the wireless security connection using the wireless host.

The present invention further discloses a method for establishing wireless security connection between a wireless device and a wireless host, which comprises steps of generating a trigger signal using the wireless device; receiving an accepting signal which is from the wireless host and related to the trigger signal using the wireless device after generating the trigger signal; and directly establishing a wireless security connection with the wireless host according to the accepting signal using the wireless device.

The present invention further discloses a method for establishing wireless security connection between a wireless device and a wireless host, which comprises steps of receiving a trigger signal which is from the wireless device using the wireless host; generating an accepting signal according to the trigger signal using the wireless host; directly establishing a wireless security connection according to the accepting signal using the wireless host and the wireless device; and providing a connection result according to the wireless security connection using the wireless host.

The present invention further discloses a wireless system, which comprises a wireless device comprising a sense unit, for generating a trigger signal; a first transceiver, for receiving an accepting signal which is from a second transceiver and related to the trigger signal after the sense unit generates the trigger signal; and a first connection establishment unit, coupled to the first transceiver, for directly establishing a wireless security connection according to the accepting signal; and a wireless host comprising the second transceiver, for receiving the trigger signal which is from the wireless device; a signal generator, for generating the accepting signal according to the trigger signal; a second connection establishment unit, for directly establishing the wireless security connection with the wireless device according to the accepting signal; and an output unit, for providing a connection result according to the wireless security connection.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
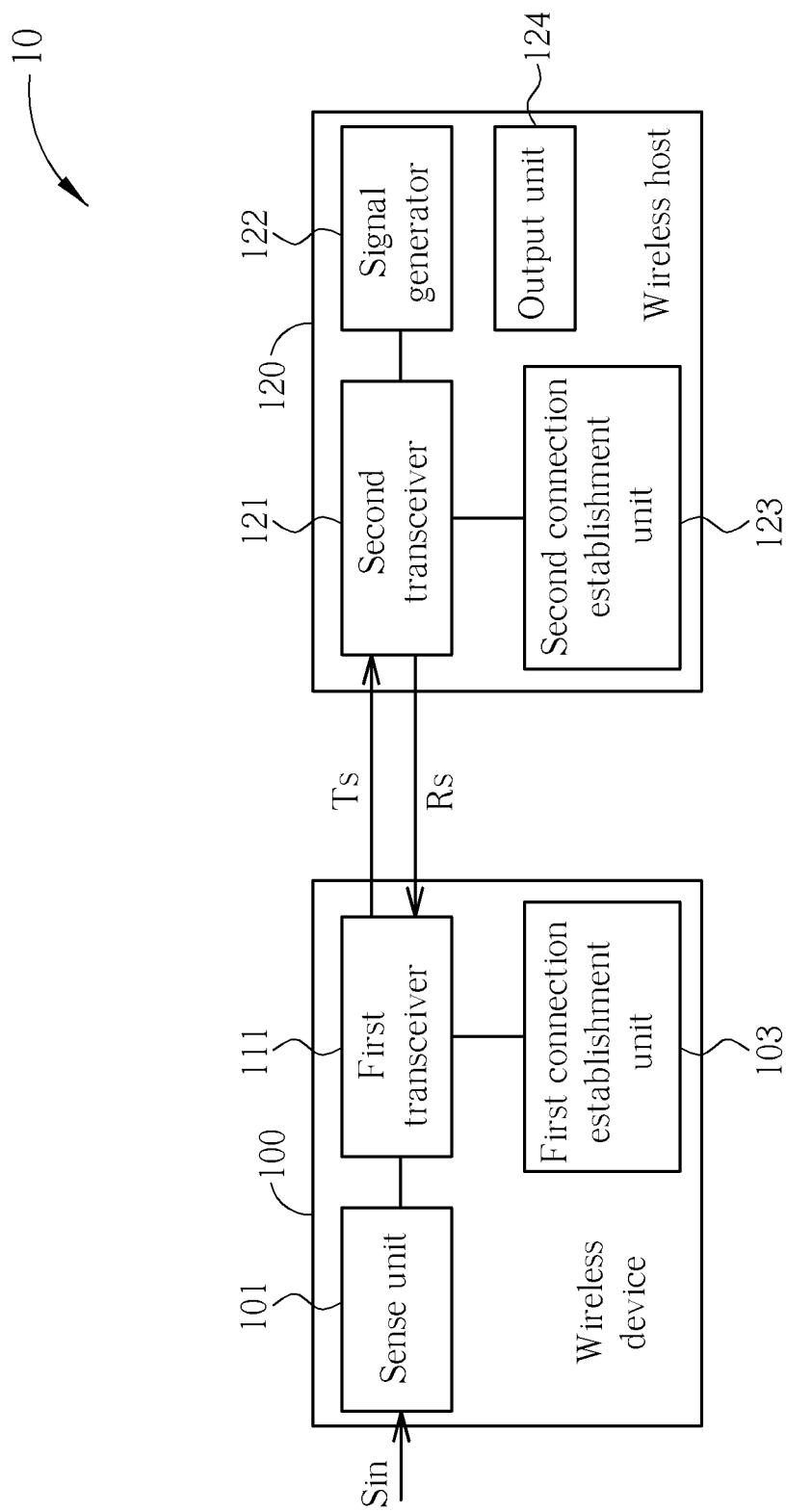
FIG. 1 illustrates a schematic diagram of a wireless system according to an embodiment of the present invention.

Please refer to FIG. 1, which illustrates a schematic diagram of a wireless system 10 according to an embodiment of the present invention. The wireless system 10 includes a wireless device 100 and a wireless host 120. The wireless device 100 can be a Bluetooth peripheral device, such as a mouse, keyboard, mobile phone, earphone, etc. The wireless host 120 can be a personal digital assistant (PDA), laptop, mobile phone, global positioning system (GPS), and not limited thereby. The wireless device 100 includes a sense unit 101, a first transceiver 111 and a first connection establishment unit 103. The wireless host 120 includes a second transceiver 121, a signal generator 122, a second connection establishment unit 123 and an output unit 124. The sense unit 101 can be a fast device, such as a hotkey, a touch sensor, an image sensor or a sound sensor, which generates a trigger signal Ts according to an input signal Sin. The input signal Sin can be generated by any means, for example by pressing, moving or sounding. The first transceiver 111 is utilized for receiving an accepting signal Rs from the wireless host 120 after the sense unit 100 generates the trigger signal Ts. The first connection establishment unit 103 is coupled to the first transceiver 111 utilized for directly establishing a wireless security connection according to the accepting signal Rs. The second transceiver 121 is utilized for receiving the trigger signal Ts from the wireless device 100. The signal generator 122 is utilized for generating the accepting signal Rs according to the trigger signal Ts. The second connection establishment unit 123 is utilized for directly establishing the wireless security connection with the wireless device 100 according to the accepting signal Rs. The output unit 124 is utilized for providing a connection result Rconnection according to the wireless security connection. Preferably, the first transceiver 111 and second transceiver 121 can be implemented in RF layer of the wireless device 100 and wireless host 120 respectively, wherein the first transceiver 111 gradually enhances transmission power of the trigger signal Ts to find the wireless host 120. Consequently, the power consumption of the wireless device 100 can be reduced, and it ensures the wireless host 120 for connection is the nearest to the wireless device 100. The wireless security connection can be a secure simple paring (SSP) connection, which automatically encrypts the connection, to secure the safety of transmission data, without any personal identification number, (hereinafter "PIN code") inputted. Note that, the wireless security connection can be any connection mechanism, as long as which conforms to self-exchange security key, such as ciphering key or integrity key, and establishes data encryption mechanism without the user PIN code, and not limited to the above mentioned SSP connection. The output unit 124 can be a liquid crystal display (LCD) monitor utilized for displaying connection result Rconnection, or any other devices which can convey the connection result Rconnection to the user, so as to inform the user whether the master device successfully establishes the connection. For example, the connection result Rconnection can be in a vocal form, and conveyed via a speaker.

Therefore, the user generates the trigger signal Ts via the sense unit 101 of the wireless device 100. A first transceiver 111 gradually enhances the transmission power of the trigger signal Ts, to search the wireless host 120. After the second transceiver 121 of the wireless host 120 receives the trigger signal Ts, the signal generator 122 generates the accepting signal Rs, and transmits accepting signal Rs via the second transceiver 121. After the first transceiver 111 receives the accepting signal Rs from the wireless host 120, the first connection establishment unit 103 of the wireless device 100 and the second connection establishment unit 123 of the wireless host 120 directly establish wireless security connection according to the accepting signal Rs, without complex operations on the user interface. Whether wireless security connection is established or not, the output unit 124 can inform the user whether the wireless security connection is successful via the connection result Rconnection. Consequently, with the auto-encryption feature of the wireless security connection, the user omits the complex operations, like entering PIN code and selecting a Bluetooth peripheral device for connection via a graphic user interface (GUI). On the other hand, the user does not have to prepare other input devices, such as universal serial bus (USB) mouse or keyboard, for inputting PIN code on the GUI. Comparing to the prior arts, the embodiment of the present invention uses the fast device, i.e. sense unit 101, rapidly establishing connection between the master device and the slave device connection, which omits manual operation of the user.

In addition, since the first transceiver 111 can gradually adjust the transmission power during the search, so as to search the presence of the master devise from near to far, and stop the search process when the master device is found. In other words, the wireless device 100 ensures to find the nearest wireless host by gradually enhancing the transmission power. Therefore, if there are several wireless hosts nearby, the embodiment of the present invention requires no selection of the master devise which the user attempts to connect with from the several master devise. On the other hand, under general situations, the number of the wireless host is just one or two. The embodiment of the present invention enables the wireless device to make connection with the nearest wireless host first by gradually adjusting the transmission power, so as to skip the manual selection.

Figure 2:
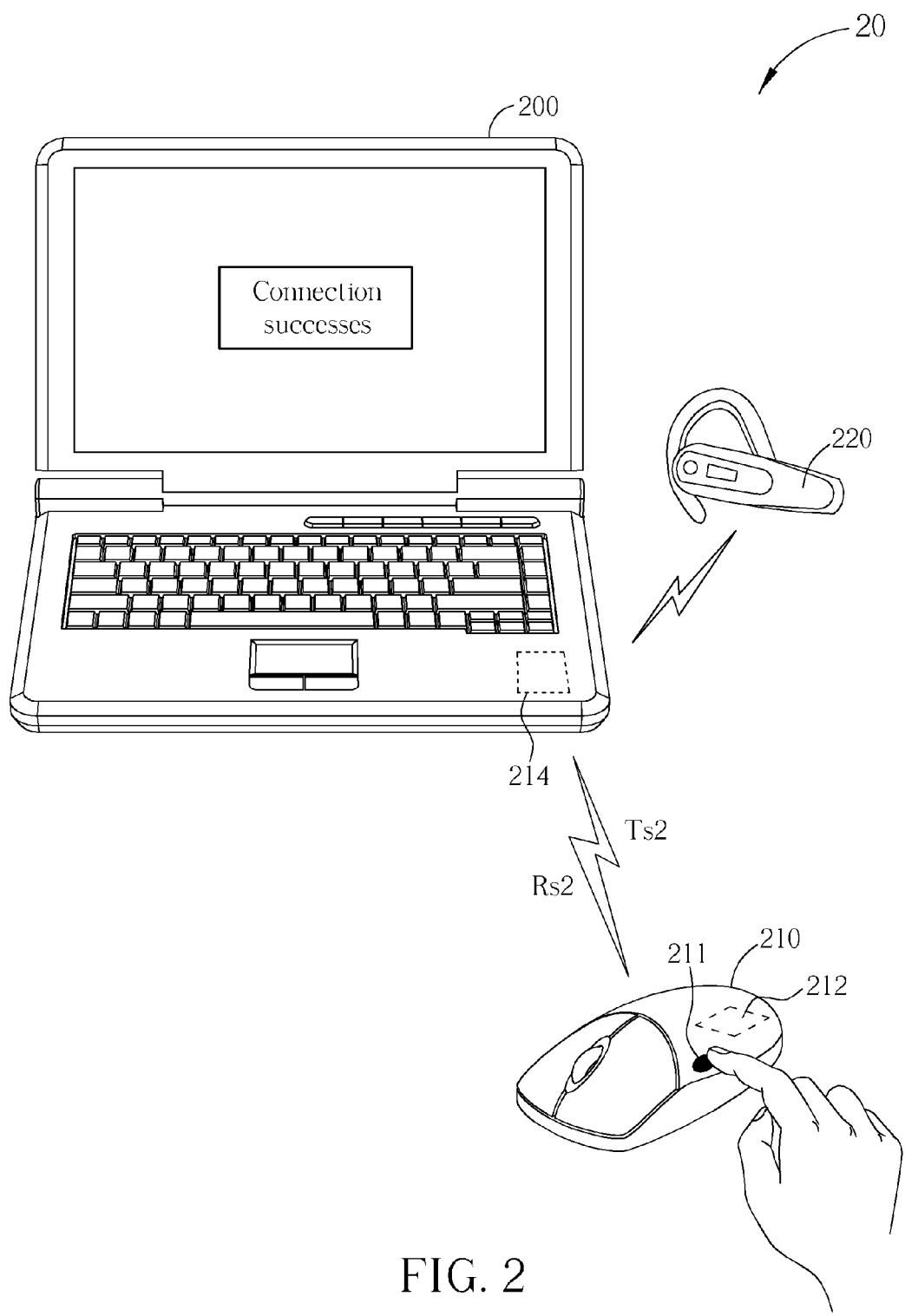
FIG. 2 illustrates a schematic diagram of a Bluetooth system according to an embodiment of the present invention.

Please refer to FIG. 2, which illustrates a schematic diagram of a Bluetooth system 20 according to an embodiment of the present invention. The Bluetooth system 20 includes a computer 200, a Bluetooth mouse 210 and a Bluetooth earphone 220. Among them, the Bluetooth mouse 210 includes a hotkey 211 and a transceiver 212. The computer 200 includes a transceiver 214. Among them, the Bluetooth mouse 210 and Bluetooth earphone 220 can be the wireless device 100 shown in FIG. 1, and the computer 200 can be the above mentioned wireless host 120. When the user presses or touches the hotkey 211 via fingers, the Bluetooth mouse 210 generates a trigger signal Ts2, and the transceiver 212 gradually enhances the transmission power of the trigger signal Ts2, so as to search Bluetooth devices nearby capable of Bluetooth transmission. When the transceiver 214 of the computer 200 receives the trigger signal Ts2, and a channel Identifier (CID) of the computer 200 is correct, the computer 200 generates an accepting signal Rs2, and transmits accepting signal Rs2 via the transceiver 214, so as to respond the Bluetooth mouse 210. After the Bluetooth mouse 210 receives the accepting signal Rs2, the Bluetooth mouse 210 and the computer 200 initiates a SSP connection procedure, to directly establish the wireless security connection. When the connection is successfully established, the monitor of the computer 200 displays a success connection message window to inform the user. On the contrary, if the connection fails, the monitor of the computer 200 displays a fail connection message window (not shown). As for the Bluetooth earphone 220, since it does not has the same CID of the computer 200, even the transceiver 212 find the Bluetooth earphone 220, the connection still cannot be established.

Figure 3:
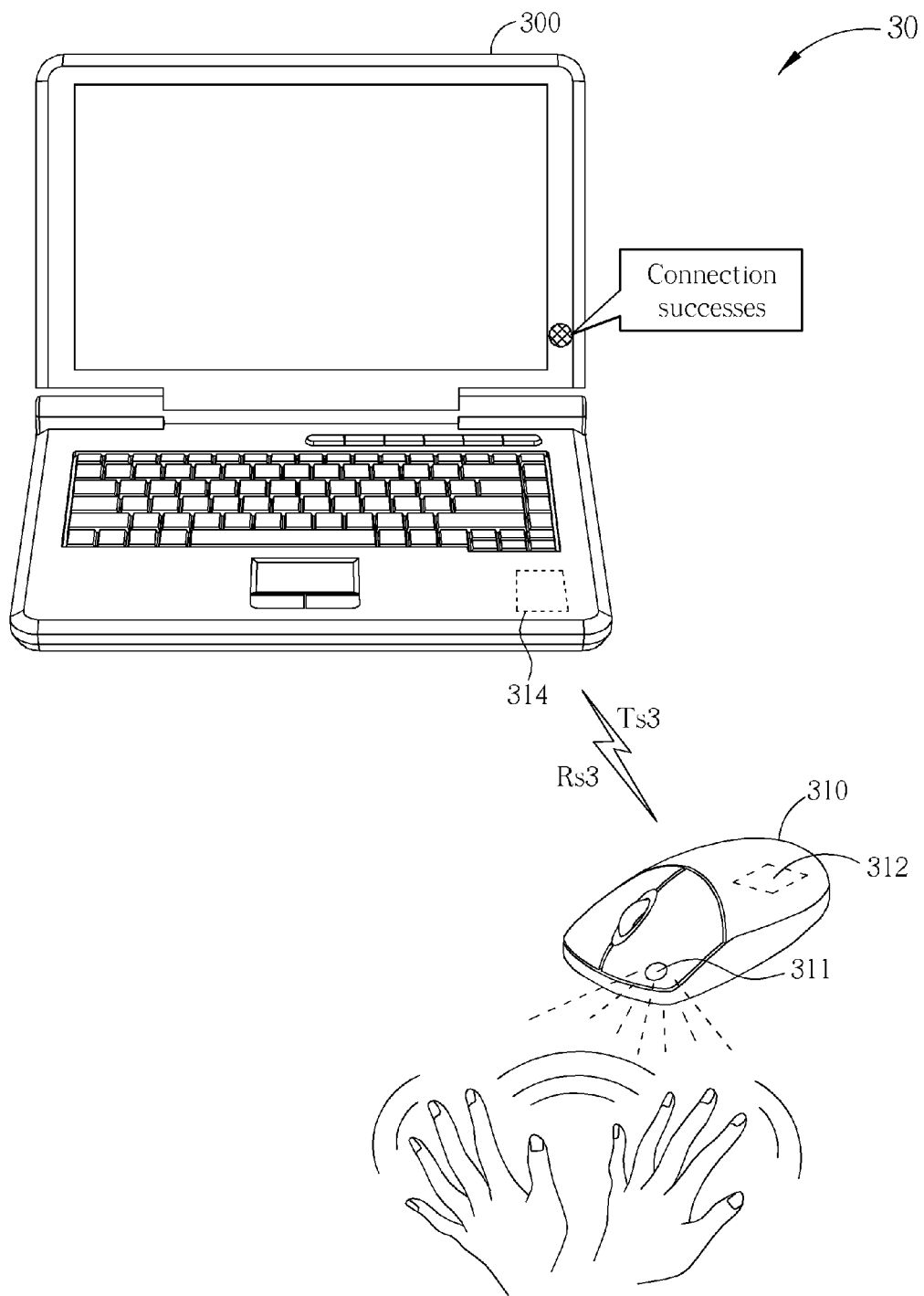
FIG. 3 illustrates a schematic diagram of another embodiment according to the present invention.

Please refer to FIG. 3, which illustrates a schematic diagram of another embodiment according to the present invention. A Bluetooth system 30 includes a computer 300 and a Bluetooth mouse 310. Among them, the Bluetooth mouse 310 includes a motion sensor 311 and a transceiver 312. The computer 300 includes a transceiver 314. Among them, the Bluetooth mouse 310 can be the wireless device 100 shown in FIG. 1, the computer 300 can be the above mentioned wireless host 120. The user can trigger the motion sensor 311 via predetermined motions, so as to generate a trigger signal Ts3. For example the user swiftly gestures back and forth three times. Similarly, the Bluetooth mouse 310 generates the trigger signal Ts3, and the transceiver 312 gradually enhances the transmission power of the trigger signal Ts3, so as to find the computer 300. When the transceiver 314 of the computer 300 receives the trigger signal Ts3, and generates an accepting signal Rs3 after verifying the CID from each caller, and transmits the accepting signal Rs3 via the transceiver 314. After the Bluetooth mouse 310 receives the accepting signal Rs3, the Bluetooth mouse 310 and computer 300 initiates a SSP connection procedure, to directly establish the wireless security connection. When the connection is successfully established, the computer 300 issues a "connection successes" voice message via a speaker to inform the user. On the contrary, if the connection fails, the computer 300 issues a "connection fails" voice message via a speaker (not shown).

Therefore, with the above mentioned two embodiments, the user can use fast devices like hotkeys and pitches on the Bluetooth peripheral device, to initiate a SSP connection, and no need to enter a PIN code and select a Bluetooth peripheral device for connection on the GUI. Besides, actively searching host computers via the Bluetooth peripheral device can reduce the probability of wrongly connected Bluetooth electronic devices.

Note that, the fast device in the embodiment of the present invention is not limited to be disposed to the Bluetooth peripheral device. The fast device can also be disposed to a PC, PDA, mobile phone or GPS. For example, if a hotkey is disposed to the PC, the user can initiates a SSP connection by pressing the hotkey on the PC, so as to establish the connection with a Bluetooth mouse.

Figure 4:
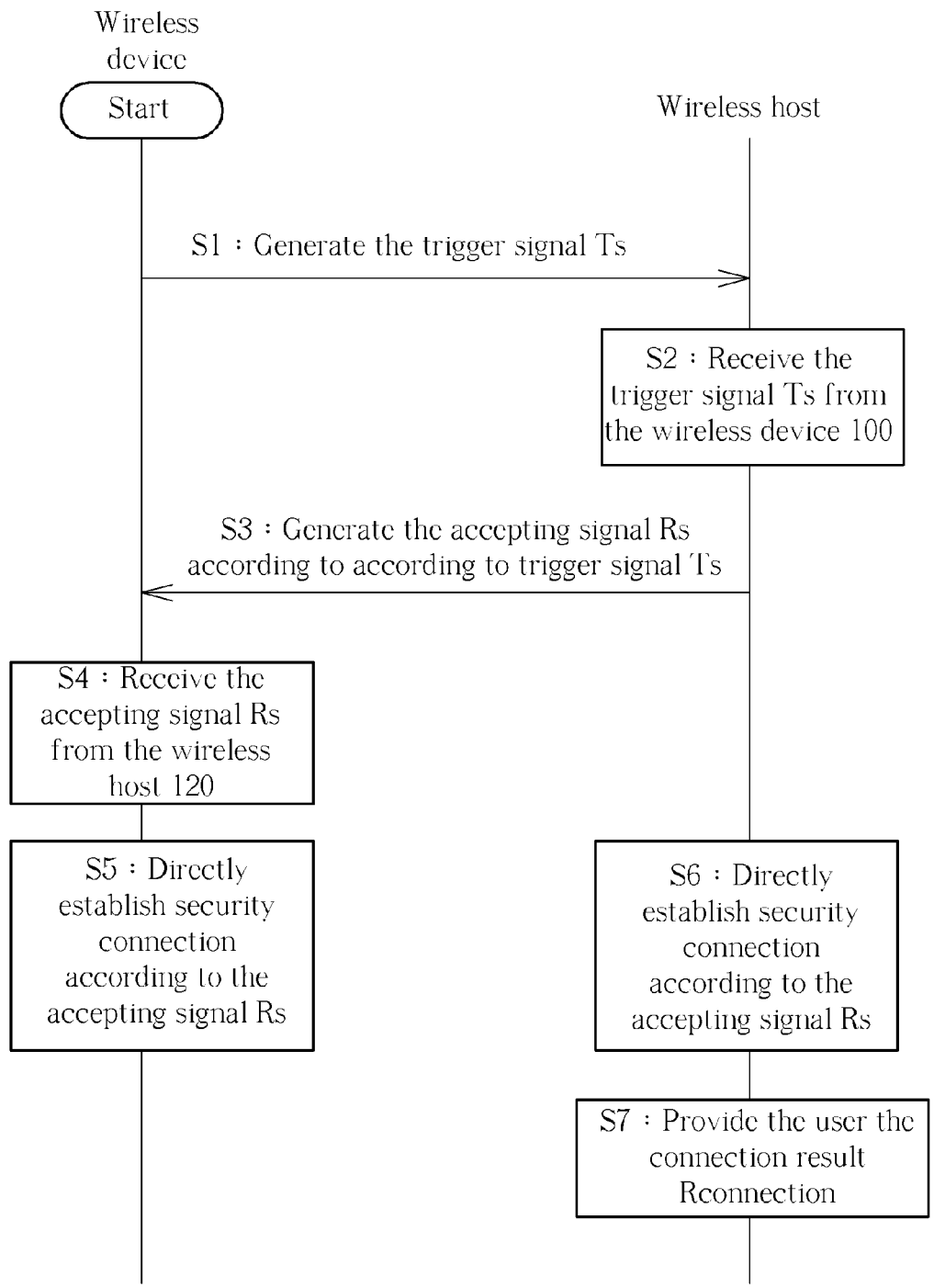
FIG. 4 illustrates a schematic diagram of a wireless security connection process according to an embodiment of the present invention

On the other hand, as for operations of the wireless system 10, it can be concluded as a wireless security connection process 40, shown in FIG. 4. The wireless security connection process 40 is utilized for the wireless system 10, so as to fast initiate a connection between the wireless device 100 and wireless host 120. In Step s1, the wireless device 100 generates the trigger signal Ts. Followed by the wireless host 120 executes Step s2, to receive the trigger signal Ts from the wireless device 100. In Step s3, the wireless host 100 generates the accepting signal Rs according to according to trigger signal Ts, and transmits the accepting signal to notify the wireless device 100 that the trigger signal Ts is received. In Step s4, the wireless device 100 receives the accepting signal Rs from the wireless host 120. Then, in Step s5 and s6, the wireless device 100 and wireless host 120 directly establish security connection according to the accepting signal Rs. No matter whether the security connection is successfully established or not, the wireless host 120 executes Step s7, so as to provide the user the connection result Rconnection. In Step s7, the connection result Rconnection is not limited to be shown on the wireless host 120 and can be shown on the wireless device 100 as well. Among them, Step s1, s3, s4 and s5 are operations of the wireless device 100, and Step s2, s6 and s7 are operations of the wireless host 120. Related detailed description is as previously mentioned, and hence omitted here. Therefore, the embodiment of the present invention deploys the sense unit 101 of the wireless device 100 to fast initiate the connection between the wireless device 100 and wireless host 120, so as to simplify the complex operation of the Bluetooth peripheral devices.

To sum up, from via the embodiment of the present invention, the user can fast and automatically establish security connections via the fast devices, i.e. sensing unit, of the Bluetooth device, which reduces the inconvenience for use and ensure the safety of the connection.

Those skilled in the art will readily observe that numerous modifications and alterations of the device and method may be made while retaining the teachings of the invention.

What is claimed is:

1. A method for establishing wireless security connection between a wireless device and a wireless host, the method comprising:
generating a trigger signal using the wireless device;
receiving the trigger signal using the wireless host;
generating an accepting signal according to the trigger signal using the wireless host;
receiving the accepting signal using the wireless device;
directly establishing a wireless security connection according to the accepting signal using the wireless host and the wireless device;
providing a connection result according to the wireless security connection using the wireless host; and
gradually enhancing transmission power of the trigger signal using the wireless device until the wireless security connection is established.

2. The method of claim 1, wherein the wireless security connection is a secure simple paring (SSP) connection.

3. The method of claim 1, wherein the trigger signal is generated via a hotkey tap, a gesture control, or a voice control.

4. The method of claim 1, wherein the connection result is a pop-up window or a voice-over.

5. A method for establishing wireless security connection between a wireless device and a wireless host, the method comprising:
generating a trigger signal using the wireless device;
receiving an accepting signal which is from the wireless host and related to the trigger signal using the wireless device after generating the trigger signal;
directly establishing a wireless security connection with the wireless host according to the accepting signal using the wireless device;
gradually enhancing transmission power of the trigger signal using the wireless device until the wireless security connection is established.

6. The method of claim 5, wherein the wireless security connection is a secure simple paring (SSP) connection.

7. The method of claim 5, wherein the trigger signal is generated via a hotkey tap, a gesture control, or a voice control.

8. A method for establishing wireless security connection between a wireless device and a wireless host, the method comprising:
- receiving a trigger signal which is from the wireless device using the wireless host;
- generating an accepting signal according to the trigger signal using the wireless host;
- directly establishing a wireless security connection according to the accepting signal using the wireless host and the wireless device; and
- providing a connection result according to the wireless security connection using the wireless host;
- wherein the wireless device gradually enhances transmission power of the trigger signal until the wireless security connection is established.

9. The method of claim 8, wherein the wireless security connection is a secure simple paring (SSP) connection.

10. The method of claim 8, wherein the trigger signal is generated via a hotkey tap, a gesture control, or a voice control.

11. The method of claim 8, wherein the connection result a pop-up window or a voice-over.

12. A wireless system, comprising:
- a wireless device, comprising:
  - a sense unit, for generating a trigger signal;
  - a first transceiver, for receiving an accepting signal which is from a second transceiver and related to the trigger signal after the sense unit generates the trigger signal; and
  - a first connection establishment unit, coupled to the first transceiver, for directly establishing a wireless security connection according to the accepting signal; and
- a wireless host, comprising:
  - the second transceiver, for receiving the trigger signal which is from the wireless device;
  - a signal generator, for generating the accepting signal according to the trigger signal;
  - a second connection establishment unit, for directly establishing the wireless security connection with the wireless device according to the accepting signal; and
  - an output unit, for providing a connection result according to the wireless security connection;
- wherein the first transceiver is further used for gradually enhancing transmission power of the trigger signal until the wireless security connection is established.

13. The wireless device of claim 12, wherein the wireless security connection is a secure simple paring (SSP) connection.

14. The wireless device of claim 12, wherein the trigger signal is generated via a hotkey tap, a gesture control, or a voice control.

15. The wireless device of claim 12, wherein the output unit is a monitor or a speaker.

16. The wireless device of claim 12, wherein the connection result is a pop-up window or a voice-over.

* * * * *